United States Patent
Scheltens

(10) Patent No.: US 8,031,848 B2
(45) Date of Patent: Oct. 4, 2011

(54) SYSTEM FOR PROVIDING COMMUNICATION SERVICES

(75) Inventor: Robert Scheltens, Oegstgeest (NL)

(73) Assignee: Koninklijke KPN N.V., The Hague (NL)

( * ) Notice: Subject to any disclaimer, the term of this patent is extended or adjusted under 35 U.S.C. 154(b) by 1195 days.

(21) Appl. No.: 11/789,857

(22) Filed: Apr. 26, 2007

(65) Prior Publication Data

US 2007/0280451 A1 Dec. 6, 2007

(30) Foreign Application Priority Data

May 2, 2006 (EP) .................................... 06009010

(51) Int. Cl.
*H04M 15/00* (2006.01)
(52) U.S. Cl. ............. 379/121.01; 379/90.01; 379/93.05; 379/245; 379/413.02; 709/219
(58) Field of Classification Search ............... 379/92.03, 379/93.02, 100.06, 121.01, 127.01, 127.06, 379/130, 133, 134, 156, 413.02, 413.03, 379/91.01, 93.05, 245; 709/219, 223, 224, 709/227, 250

See application file for complete search history.

(56) References Cited

U.S. PATENT DOCUMENTS

| 5,185,785 | A | * | 2/1993 | Funk et al. ..................... 379/111 |
| 5,835,580 | A | * | 11/1998 | Fraser ....................... 379/115.01 |
| 5,881,131 | A | | 3/1999 | Farris et al. |
| 6,304,647 | B1 | | 10/2001 | Frost |
| 7,152,111 | B2 | * | 12/2006 | Allred et al. ................... 709/227 |
| 7,660,308 | B2 | * | 2/2010 | Hasegawa et al. ............ 370/392 |
| 2004/0044771 | A1 | * | 3/2004 | Allred et al. ................... 709/227 |
| 2004/0190699 | A1 | | 9/2004 | Doherty et al. |
| 2008/0002706 | A1 | * | 1/2008 | Hasegawa et al. ............ 370/392 |

OTHER PUBLICATIONS

M. Malek et al, "On-Line Provisioning of Network Services", IEEE Journal on Selected Areas in Communications, XP-000819873, vol. 6, No. 4, May 1988, pp. 662-668.

* cited by examiner

*Primary Examiner* — Binh Tieu
(74) *Attorney, Agent, or Firm* — Michaelson & Associates; Peter L. Michaelson

(57) ABSTRACT

A system is described for providing communication services and this system comprises a communication network with a number of exchanges and a number of connection points. Each connection point is connected by a fixed line to an exchange and is adapted to connect at least one communication terminal to the corresponding exchange. First connection points of the number of connection points are in an operative state and second connection points of the number of connection points are in an inoperative state. Operative connection points allow a communication terminal connected thereto access to at least one communication service through the system by having been assigned a unique address from a first group of unique addresses to each of the operative connection points. The inoperative state of the second connection points includes a standby state and the exchanges are adapted to recognize the standby state of an inoperative connection point used by a communication terminal to access the system and to allow the communication terminal connected to this inoperative connection point access to a transaction server through the corresponding exchange. The transaction server is adapted to switch an inoperative connection point into the operative state by assigning a unique address from the first group of unique addresses to this inoperative connection point so that the inoperative connection point is changed into an operative connection point.

12 Claims, 1 Drawing Sheet

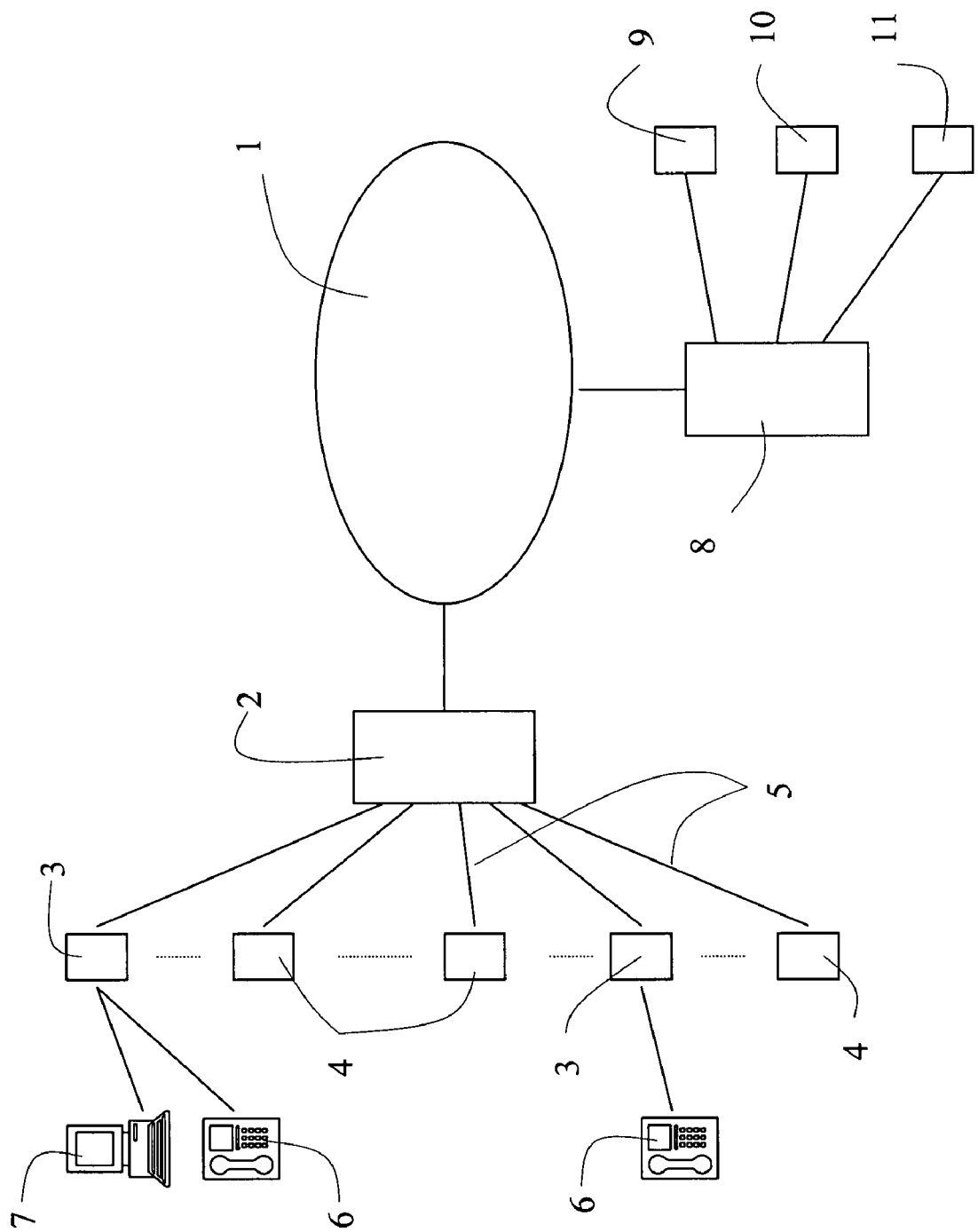

SYSTEM FOR PROVIDING COMMUNICATION SERVICES

BACKGROUND OF THE INVENTION

1. Field of the Invention

The invention relates to a system for providing communication services, comprising a communication network with a number of exchanges and a number of connection points, each connection point being connected by a fixed line to an exchange and being adapted to connect at least one communication terminal to the corresponding exchange, wherein first connection points of said number of connection points are in an operative state and second connection points of said number of connection points are in an inoperative state, wherein operative connection points allow a communication terminal connected thereto access to at least one communication service through said system by having been assigned a unique address from a first group of unique addresses to each of the operative connection points.

2. Description of the Prior Art

An example of such a system is a fixed line telephone network, wherein telephone terminals connected to the first connection points allow subscribers to call other subscribers connected through first connection points to the same telephone network or to other telephone networks interconnected to the first telephone network.

In order to switch a second connection point from the inoperative to the operative state, the operator of the telephone network has to determine through his network administrative system which of the large number of fixed lines connected to the corresponding exchange is connected to the second connection point to be switched to the operative state. This operation is complex and time consuming. Moreover, in particular at locations with a large number of connection points this operation easily leads to errors in the selection of the fixed line of the connection point to be switched into the operative state.

SUMMARY OF THE INVENTION

The invention aims to provide a system of the above-mentioned type, wherein the operation of switching a connection point to the operative state is easy and substantially error-free.

According to the invention the system is characterised in that the inoperative state of the second connection points includes a standby state, and in that the exchanges are adapted to recognise the standby state of an inoperative connection point used by a communication terminal to access the system and to allow the communication terminal connected to this inoperative connection point access to a transaction server through the corresponding exchange, wherein said transaction server is adapted to switch an inoperative connection point into the operative state by assigning a unique address from the first group of unique addresses to this inoperative connection point so that the inoperative connection point is changed into an operative connection point.

In this manner a system for providing communication services is obtained, wherein the standby state of second connection points in the inoperative state allows recognition of such second connection points used to access the system so that the exchange can allow access to the transaction server. This means that actually the fixed line connecting the second connection point to the exchange identifies itself at the exchange as the fixed line to be activated. Errors in selecting the fixed line of the connection point to be switched into the operative state are prevented in this manner. Moreover, after authorization of the subscriber using the communication terminal, any communication service requested by the subscriber can be provided in a quick and easy manner.

In a preferred embodiment, the inoperative connection points each have been assigned a second unique address of a second group of unique addresses, wherein the exchanges are adapted to recognise an inoperative connection point used by a communication terminal to access to the system by means of its unique address of the second group of unique addresses and to connect such a communication terminal to the transaction server. In this manner a system is obtained, wherein available technology in the exchanges can be used to recognize inoperative connection points through their unique addresses. The second group of unique addresses comprises for example free or unused telephone numbers or IP-addresses depending on the type of connection points and exchanges used in the system.

BRIEF DESCRIPTION OF THE DRAWING

The invention will be further explained by reference to the drawing in which the sole figure schematically shows an embodiment of the invention.

DETAILED DESCRIPTION

As shown in the sole figure, the system for providing communication services, such as for example telephone, internet and TV, comprises a communication network 1 with a number of exchanges 2, only one of which is shown, and a number of connection points 3,4. Each connection point 3,4 is connected by a fixed line 5 to an exchange 2. Each connection point 3,4 is adapted to connect at least one communication terminal 6,7 to the corresponding exchange 2. By way of example, the drawing shows that one connection point 3 connects a telephone 6 and one connection point 3 connects a telephone 6 and a PC 7 to the exchange 2.

The connection points 3 are in an operative state and these operative connection points 3 allow a communication terminal 6,7 connected thereto access to at least one communication service provided through the system described. To this end a unique address will be assigned to each of the operative connection points 3. The unique addresses of operative connection points 3 form a first group of unique addresses. In case of telephone services, the unique address may be a telephone number and in case of internet services, the unique address may be an IP address. These telephone numbers and IP addresses are used by the system and the exchanges 2 in a usual manner to allow the telephone 6 or PC 7 access to the system. It is noted that the assignment of unique addresses to the operative connection points 3 in the system and the exchanges, in particular, occurs in a usual manner and will not be described further.

In the system described, the inoperative state of the connection points 4 includes a standby state, in which a connection terminal 6,7 connected to an inoperative connection point 4 is still allowed to make a connection to the corresponding exchange 2. The exchanges 2 are adapted to recognize the standby state of an inoperative connection point 4 used by a communication terminal 6,7 to access the system and in case such an inoperative connection point is recognized, the exchange 2 allows the communication terminal 6,7 to access a transaction server 8. Through a suitable interface, such as a graphic user interface in case of a PC 7 or a voice response system in case of a telephone 6, a user of the communication terminal 6,7 can communicate with the transaction server 8 to obtain one or more communication services from the system as will be described hereinafter. In case a user is authorized to obtain a communication service, the transaction server 8 switches the corresponding inoperative connection point 4 into the operative state by assigning a unique address from the first group to this inoperative connection point 4 in the corresponding exchange 2. In this manner the inoperative connection point 4 is actually changed into an operative connection point 3.

In the embodiment described, the exchanges 2 recognize the standby state of inoperative connection points 4 in that the inoperative connection points 4 each have been assigned a second unique address of a second group of unique addresses, which second group of unique addresses are also telephone numbers and IP addresses have not been assigned to operative connection points 3 within the system as yet. The exchanges 2 are adapted to recognize inoperative connection points 4 by means of the corresponding unique addresses of the second group of unique addresses. To this end the system is provided for example with a database containing the second group of unique addresses. The database can be arranged for example as a plurality of distributed databases at the exchanges 2 or a centralized database at the transaction server 8. As an alternative a database containing the first group of unique addresses can be used and if the unique address of the connection point 4 used to access the system is not found in the database the exchange recognizes the address as contained in the second group.

In case a connection point 3,4 is used by a communication terminal 6,7 to access the system, the corresponding exchange 2 checks with the database whether the unique address of this connection point 3,4 is contained in this second group of unique addresses. If so, the exchange 2 allows the communication terminal 6,7 to connect with the transaction server 8 and a process is started so that the user of the communication terminal 6,7 may select one or more communication services from the system. The connection can be made automatically by the exchange 2 or by dialling or entering a specific address of the transaction server 8. The user interface of the transaction server 8 may also allow the user of the communication terminal 6,7 to select a service provider in case the system is arranged to provide communication services of a plurality of service providers. In the embodiment show, three different service provider servers 9, 10 and 11 are shown and the user interface of the transaction server 8 allow selection of any of these service provider servers 9-11. The transaction server 8 is adapted to connect the communication terminal 6,7 accessing the system to the selected service provider server 9,10 or 11. The authorization of a user to obtain a communication service either directly from the transaction server 8 or from a selected service provider server 9-11 may occur in a manner known per se and will not be described further.

It is noted that the system also allows a communication terminal 6,7 connected to an operative connection point 3 to access the transaction server 8, for example by dialling a specific service number in case of a telephone 6 or accessing a web address in case of a PC 7. If the transaction server 8 is accessed from an operative connection point 3, the user of the terminal 6,7 can obtain further communication services from the system or can change the communication services which are provided by the system to this connection point 3.

It is noted that assigning a unique address from the first group of unique addresses to an inoperative connection point is possible in several ways. The unique address of the inoperative connection point which is contained in the second group of unique addresses can be transferred from this second group to the first group of unique addresses. As an alternative, another unique address which is not in use within the system can be assigned to this inoperative connection point 4 so that this other unique address becomes a member of the first group of unique addresses and the connection point 4 will become an operative connection point 3. In this case the unique address of the second group will be removed from this new operative connection point 3. However, as an alternative it is possible to maintain the unique address of the second group at this connection point so that the connection point can act both as an operative and inoperative connection point 3 or 4, depending on the unique address used by the communication terminal 6,7 connected to the connection point. This embodiment allows to connect a new communication terminal 7 to an operative connection point 3, wherein for this new terminal 7 the connection point 3 uses the unique address of the second group, so that this connection point is recognized by the exchange 2 as inoperative for this new terminal and the described procedure is followed to allow this new terminal 7 to obtain a further communication service from the system. In this manner the connection point can be shared by different users.

It is further noted that changing the communication services provided by the system to an operative connection point 3 may also include changing the operative connection point from the operative into the inoperative state. To this end, the first unique address of the operative connection point 3 can be transferred from the first group to the second group of unique addresses. This possibility allows a user to move the delivery of his communication services from one location to an other location either temporarily or permanently.

It is noted that the exchanges 2 can be embodied in several manners. The exchange can for example be embodied as a PSTN exchange or can be a combination of an PSTN exchange and a DSLAM. As an alternative the exchange can be embodied as a VDSL in case of an all IP communication network. In the same manner, the connection points 3,4 can be embodied as an ISRA point or a so-called residential gateway. The communication services provided by the system may include the provision of TV signals.

The invention is not restricted to the above-described embodiments which can be varied in a number of ways within the scope of the following claims.

The invention claimed is:

1. System for providing communication services, comprising a communication network with a number of exchanges and a number of connection points, each connection point being connected by a fixed line to an exchange and being adapted to connect at least one communication terminal to the corresponding exchange, wherein first connection points of said number of connection points are in an operative state and second connection points of said number of connection points are in an inoperative state, wherein operative connection points allow a communication terminal connected thereto access to at least one communication service through said system by having been assigned a unique address from a first group of unique addresses to each of the operative connection points, characterised in that the inoperative state of the second connection points includes a standby state, and in that the exchanges are adapted to recognise the standby state of an inoperative connection point used by a communication terminal to access the system and to allow the communication terminal connected to this inoperative connection point access to a transaction server through the corresponding exchange, wherein said transaction server is adapted to switch an inoperative connection point into the operative state by assigning a unique address from the first group of unique addresses to this inoperative connection point so that the inoperative connection point is changed into an operative connection point.

2. System according to claim 1, wherein the inoperative connection points each have been assigned a second unique address of a second group of unique addresses, wherein the exchanges are adapted to recognise an inoperative connection point used by a communication terminal to access to the system by means of its unique address of the second group of unique addresses and to connect such a communication terminal to the transaction server.

3. System according to claim 1, wherein the transaction server is adapted to present a user interface to a communication terminal accessing the system from an inoperative connection point, wherein the user interface allows selection of a communication service and/or service provider.

4. System according to claim 3, wherein the transaction server is adapted to connect a communication terminal accessing the system from an inoperative connection point to a selected service provider server.

5. System according to claim 2, wherein the transaction server is adapted to assign a unique address from the first group of unique addresses to an inoperative connection point by transferring its unique address from the second group to the first group of unique addresses.

6. System according to claim 2, wherein the second unique address of the second group of addresses is maintained at the inoperative connection point switched into the operative state to allow a further communication terminal connected to the connection point access to the transaction server independent from the communication terminal used to switch the communication point into the operative state.

7. System according to claim 1, wherein the transaction server is adapted to switch an operative connection point from the operative into the inoperative state so that the operative connection point is changed into an inoperative connection point.

8. System according to claim 6, wherein the transaction server is adapted to switch an operative connection point from the operative into the inoperative state by transferring its unique address from the first group to the second group of unique addresses.

9. Transaction server to be used in a system according to claim 1.

10. Exchange to be used in a system according to claim 1.

11. Computer program including a set of instructions capable, when incorporated in a machine-readable medium, of causing a system having information processing capabilities to implement the transaction server of claim 9.

12. Computer program including a set of instructions capable, when incorporated in a machine-readable medium, of causing a system having information processing capabilities to implement the exchange of claim 10.

* * * * *